(12) United States Patent
Zhou et al.

(10) Patent No.: US 11,022,622 B2
(45) Date of Patent: Jun. 1, 2021

(54) HIGH-THROUGHPUT SCREENING SYSTEM BASED ON MULTI-MANIPULATORS

(71) Applicant: Jiangnan University, Wuxi (CN)

(72) Inventors: Jingwen Zhou, Wuxi (CN); Jian Chen, Wuxi (CN); Meng Ning, Wuxi (CN); Guocheng Du, Wuxi (CN); Weizhu Zeng, Wuxi (CN); Xiaomei Cao, Wuxi (CN); Qiuju Zhang, Wuxi (CN); Jun Fang, Wuxi (CN)

(73) Assignee: JIANGNAN UNIVERSITY, Wuxi (CN)

( * ) Notice: Subject to any disclaimer, the term of this patent is extended or adjusted under 35 U.S.C. 154(b) by 476 days.

(21) Appl. No.: 15/708,955

(22) Filed: Sep. 19, 2017

(65) Prior Publication Data

US 2019/0004073 A1 Jan. 3, 2019

(30) Foreign Application Priority Data

Jun. 30, 2017 (CN) .......................... 201710523897.X

(51) Int. Cl.
| | | |
|---|---|---|
| *G01N 9/30* | (2006.01) | |
| *G01N 35/00* | (2006.01) | |
| *B01L 9/00* | (2006.01) | |
| *B01L 3/00* | (2006.01) | |
| *G01N 35/10* | (2006.01) | |
| *G01N 1/31* | (2006.01) | |
| *G01N 35/04* | (2006.01) | |

(52) U.S. Cl.
CPC ............ *G01N 35/0099* (2013.01); *B01L 9/50* (2013.01); *B01L 3/5085* (2013.01); *B01L 2200/141* (2013.01); *B01L 2300/0893* (2013.01); *G01N 1/31* (2013.01); *G01N 35/10* (2013.01); *G01N 2035/0418* (2013.01)

(58) Field of Classification Search
CPC ................. G01N 35/0099; G01N 2035/00326
USPC ................................................ 422/68.01, 72
See application file for complete search history.

(56) References Cited

U.S. PATENT DOCUMENTS 5,578,269 A * 11/1996 Yaremko ............. G01N 35/025
210/361

* cited by examiner

*Primary Examiner* — Natalia Levkovich
(74) *Attorney, Agent, or Firm* — IPro, PLLC

(57) ABSTRACT

The invention provides a high-throughput screening system based on multi-manipulators, and belongs to the field of biotechnology and detection equipment. A high-throughput screening system based on multi-manipulators, comprises of the first manipulator, sampler, pipette, plate washer, microplate reader, the second manipulator, centrifuge, deep-well plate library, waste shallow-well plate barrel, shallow-well plate library, waste needle plate barrel, needle library, waste deep-well plate barrel, collection box. The present invention is a combination of microbiology and mechanics. The aim of the invention is to realize the automation and intelligentization of the high throughput screening experiment, effectively improve the experimental accuracy, reliability and efficiency. It contributes to the development of high throughput screening technology for microorganisms and drugs.

7 Claims, 2 Drawing Sheets

ND MULTI-MANIPULATORS

CROSS-REFERENCES AND RELATED APPLICATIONS

This application claims the benefit of priority to Chinese Application No. 201710523897.X, entitled "A high-throughput screening system based on multi-manipulators", filed Jun. 30, 2017, which is herein incorporated by reference in its entirety.

BACKGROUND OF THE INVENTION

Field of the Invention

The invention relates to a high-throughput screening system based on multi-manipulators which is established in microbial breeding and robotics, and belongs to the field of biotechnology.

Description of the Related Art

The high-throughput screening technology refers to a new technique based on the molecular level and cell level experimental methods, using automatic systems, micro-plate carriers, quick and sensitive detectors, data processing and control software. High Throughput Screening allows a researcher to conduct millions of biochemical, genetic or pharmacological tests at the same time and to rapidly select out what he wants. In the context of the continuous development of microbial breeding technology, screening techniques determine the efficiency of hitting the target strains from a large pool of bacteria.

At present, domestic high-throughput screening system is mainly dependent on imported equipment. Sample transfer between the test devices still requires manual operation. There is still a need for manual search and matching between the final screening selection and the sample. There are usually tens of millions of samples need to be detected. The single operation step makes work tedious and the operators are prone to fatigue and error, which restricts the development of high-throughput screening to some extent. At present, most of China's microbial screening relies on imported equipment. Robots have not yet been used to implement automated high-throughput screening systems.

SUMMARY OF THE INVENTION

The invention is aimed at solving the main problems that the sample screening process of domestic high-throughput screening system is non-automatic and the number of the sample screening targets is enormously limited. It is necessary to provide a high-throughput screening system with multi-manipulators based on the combination of microbial breeding and robotics.

The high-throughput screening system based on multi-manipulators comprises of the first manipulator, sampler, pipette, plate washer, microplate reader, the second manipulator, centrifuge, deep-well plate library, waste shallow-well plate barrel, shallow-well plate library, waste needle plate barrel, needle library, waste deep-well plate barrel, collection box. The system is divided into 3 parts. Two manipulators installed on a horizontal table and are surrounded by collection box, sampler, pipette, plate washer, microplate reader, deep-well plate library, waste shallow-well plate barrel, waste needle plate barrel, shallow-well plate library, needle library, waste deep-well plate barrel in a clockwise order. The distances between these devices are appropriate and fixed, within the control range of two manipulators.

In one embodiment of the present invention, the high-throughput screening system based on multi-manipulators comprises of one sampler and one pipette with the functions of large flux liquid extraction and pipetting. They are used to draw samples from deep-well plate and transfer samples to the shallow one for microplate reader detection.

In one embodiment of the present invention, the plate washer can be type HydroFlex with efficient overflow cleaning mode.

In one embodiment of the present invention, the microplate reader can be instruments with a system integrated automatic digital microscope and/or microplate detector, with a filter-based high-performance detection optical path and grating-based highly flexible detection optical path. The data obtained by the microplate reader analysis is transferred to the data processing system.

In one embodiment of the present invention, two manipulators cooperate with each other to complete the automatic plate loading and unloading and transferring.

In one embodiment of the present invention, the deep-well plate library is obtained by digging grooves on a plate according to the shape of deep-well plate. The number of said grooves may be 48 and one groove for one deep-well plate. There is enough space between adjacent grooves for manipulator to catch the deep-well plate.

In one embodiment of the present invention, the shallow well plate library is obtained by digging on a plate according to the shape of shallow-well plate. The number of said grooves may be 3*4=12 and one groove for four shallow-well plates. The manipulator takes the top one once.

In one embodiment of the present invention, the waste shallow-well plate barrel, the waste deep-well plate barrel and the waste needle plate barrel are respectively used to collect the used discarded shallow-well plate, deep-well plate and sampling needle.

In one embodiment of the present invention, the needle library is used to store the needles for the sampler and the pipette.

In one embodiment of the present invention, the collection box is used to collect residual liquid from deep-well plates which have been verified to contain samples meeting screening target.

In view of the urgent need of modern microbial high throughput screening, the present invention carries out high-throughput screening with the cooperation of multi-manipulator. The present invention is a combination of microbiology and mechanics. It promotes the automation of microbial high-throughput screening system for screening microorganisms with specific properties. Manual operation takes five minutes to detect one 96-well plate, while this system can handle 15 96-well plates per minute which shows a great improvement in efficiency. The system can effectively contribute to the development of microbial breeding technology and further promote the development of microbial science.

Figure 1:
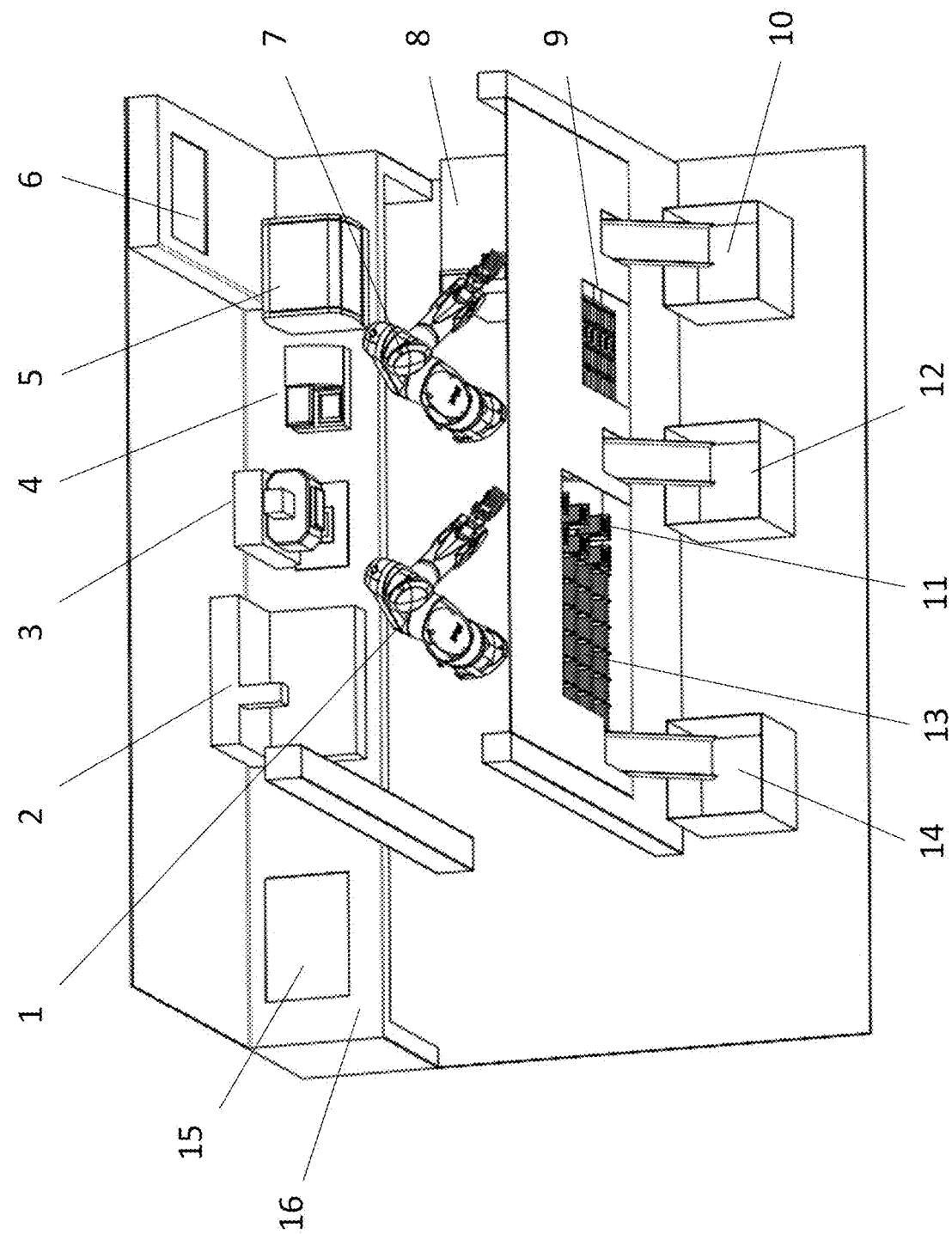
FIG. 1 is a general frame diagram of one embodiment of the present invention.

In the diagrams: 1: the first manipulator, 2: sampler, 3: pipette, 4: plate washer, 5: microplate reader, 6: ventilator, 7: the second manipulator, 8: centrifuge, 9: deep-well plate library, 10: waste shallow-well plate barrel, 11: shallow-well plate library, 12: waste needle plate barrel, 13: needle library, 14: waste deep-well plate barrel, 15: collection box; 16. horizontal table.

DETAILED DESCRIPTION OF THE EMBODIMENTS

A further description of the present invention is provided in conjunction with the diagrams and embodiments:

The high-throughput screening system based on multi-manipulator comprises of the first manipulator 1, sampler 2, pipette 3, plate washer 4, microplate reader 5, ventilator 6, the second manipulator 7, centrifuge 8, deep-well plate library 9, waste shallow-well plate barrel 10, shallow-well plate library 11, waste needle plate barrel 12, needle library 13, waste deep-well plate barrel 14, collection box 15.

Figure 2:
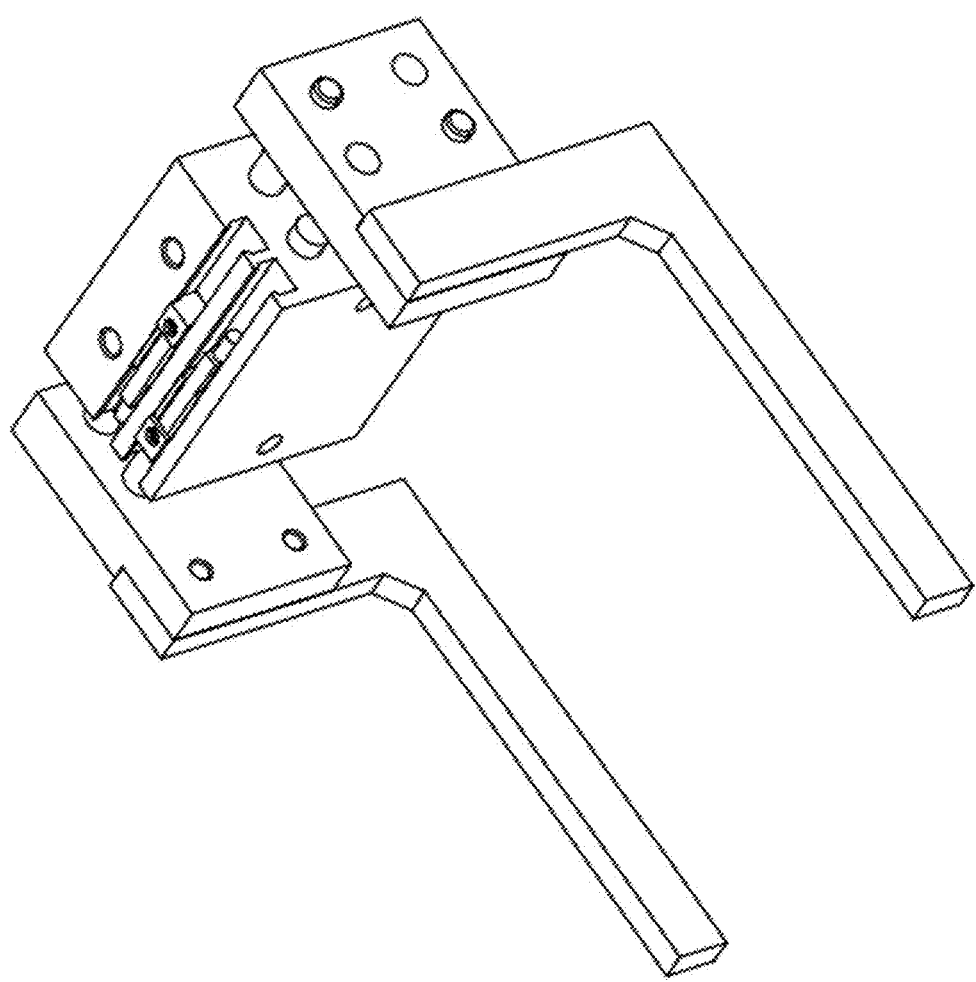
FIG. 2 is a frame diagram of the manipulator gripper.

As shown in FIG. 1 and FIG. 2, on one side of the manipulators, the collection box 15, the sampler 2, the pipette 3, the plate washer 4, and the microplate reader 5 are placed orderly on the horizontal table. The distances between these devices are appropriate and fixed, within the control range of two manipulators. On the other side of the manipulators, the deep-well plate library 9, waste shallow-well plate barrel 10, waste needle plate barrel 12, shallow-well plate library 11, needle library 13 and waste deep-well plate barrel 14 are placed orderly. According to the running speed of the system, workers add new deep-well plates, shallow-well plates and needle plates once in a while and take away the waste materials.

The specific work process of the system is as followed: the first manipulator 1 carries new needle from needle library 13 to sampler 2, sampler 2 puts on a new needle, the second manipulator 7 carries a deep-well plate from deep-well plate library 9 to centrifuge 8 which has a pre-set fixed value of rotating speed. After centrifugation, the second manipulator 7 takes the deep-well plate containing fermentation supernatant from centrifuge 8 to sampler 2, sampler 2 draws sample from deep-well plate and deep-well plate remains still. The first manipulator 1 takes the shallow-well plate from shallow well plate library 11 to sampler 2, sampler 2 release fermentation supernatant drawn from the deep-well plate into the shallow one. The second manipulator 7 takes the shallow-well plate to the pipette 3. The sampler 2 uploads needles, then the first manipulator 1 puts waste needles to waste needle plate barrel 12. Then, the pipette 3 drips the staining agent to shallow-well plate which is then carried to plate washer 4 by the second manipulator 7. Fermentation supernatant and staining agent in shallow-well plate are mixed evenly in plate washer 4. Next, the shallow-well plate is transferred to the opened warehouse of microplate reader 5 by the second manipulator 7. Then the microplate reader 5 closes its door and begins the analysis, the open and close of microplate reader's door is automatic. When the microplate reader 5 finishes its work, the second manipulator 7 puts waste shallow-well plate into waste shallow-well plate barrel 10. The sampler 2 loads new needles and extracts corresponding liquid from deep-well plate to the collection box 15 according to the analysis result of samples in shallow-well plate. Then the first manipulator 1 puts the deep-well plate into waste deep-well plate barrel 14, the sampler 2 unloaded needles which will be transferred to waste needle plate barrel 12.

For example, in order to select out microorganisms which can secret specific substances from 100 strains. One can cultivate 100 strains to obtain their fermentation broth. Fermentation broth is added to the deep-well plate with parallel samples. These samples are transferred by the manipulators from deep-well plate to the shallow one for detection by microplate reader. Rapidly, according to the test results of microplate reader, the target strains are selected from 100 microorganisms. And then the target samples are collected to the collection box. During manual operation, sampling and transferring plates take too much time. When using high-throughput screening system based on multi-manipulators, operator can spent time analyzing data or something else while the screening system is running. And of course, the samples added to the deep-well plate can be microbial fermentation supernatant or microbial cell disruption which contains markers.

The sampler 2 and pipette 3 can be smart pipetting system Micro Shot 705 (8-channel or 16-channel). The MS705 is a noncontact wide range dispenser that can fill a variety of microplates, including 6/12/24/48/96/385/1536. User changeable and autoclavable 8-channel and 16-channel dispense heads allow users to dispense into low-profile, PCR, standard and deep-well plates quickly and with precision. An optional plate stacker (two stacks) is available to enable extended walkaway operation of up to 25 plates.

The plate washer 4 can be type HydroFlex with efficient overflow cleaning mode.

The microplate reader 5 with oscillating mixer can be Cytation 3 cell imaging multi-mode reader of BioTek® Instruments, Inc (with a system integrated automatic digital microscope and/or microplate detector, with a filter-based high-performance detection optical path and grating-based highly flexible detection optical path).

The centrifuge 8 can be ROTANTA 460 Robotic from Germany Hettich Lab Technology. The centrifuge is ideal for sample centrifugation in clinical chemistry (pre-analysis) and biotechnology. The system can be operated completely automatically through the perfect interplay of centrifuge and robot.

In the present embodiment, the form of needle loaded is dependent on the type of the sampler.

In the present embodiment, the form of needle unloaded is dependent on the type of the sampler.

In the present embodiment, the test result is transferred to data processing system after microplate reader's detection.

In the present embodiment, the following three steps are repeated twice: the sampler loading new needles, extracting corresponding liquid to the collection box 15 according to the analysis result and unloading the needles.

In the present embodiment, two manipulators cooperate with each other to complete the automatic loading and unloading of the plates.

In the present embodiment, the deep-well plate library is obtained by digging grooves on a plate according to the shape of deep-well plate. The number of said grooves may be 48 and one groove for one deep-well plate. There is enough space between adjacent grooves for manipulator to catch the deep-well plate.

In the present embodiment, the shallow well plate library is obtained by digging on a plate according to the shape of shallow-well plate. The number of said grooves may be 3*4=12 and one groove for four shallow-well plates. The manipulator takes the top one once.

In the present embodiment, new needles are used in each supernatant drawing to avoid contamination of the sample.

In the present embodiment, we choose the ABB manipulator, model IRB 1600-10/1.2, this robot has handling capacity of 10 kg, 1.2 m reach, robot weight 250 kg.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A high-throughput screening system, comprising:
   a first manipulator and a second manipulator each installed on a horizontal table and each configured to handle at least one 96-well microplate,
   a sampler,
   a pipette,
   a 96-well microplate washer,
   a 96-well microplate reader,
   a centrifuge,
   a first 96-well microplate library,
   a waste second 96-well microplate barrel configured to hold a second 96-well microplate,
   a second 96-well microplate library,
   a waste needle microplate barrel configured to collect used sampling needles,
   a needle library configured with space for storing sampling needles fitting the sampler and the pipette,
   a waste first 96-well microplate barrel configured to hold a first 96-well microplate, and
   a collection box configured to collect residual liquid from the first 96-well microplate;
   wherein the collection box, the sampler, the pipette, the 96-well microplate washer, the 96-well microplate reader, the first 96-well microplate library, the waste second 96-well microplate barrel, the waste needle microplate barrel, the second 96-well microplate library, the needle library, and the waste first microplate barrel are placed on the horizontal table surrounding the first and second manipulators;
   wherein the first 96-well microplate and the second 96-well microplate are each comprised of 96 uniform wells, and wherein each of the wells of the first 96-well microplate holds more liquid than each of the wells of the second 96-well microplate.

2. The high-throughput screening system according to claim 1, wherein the sampler and pipette are capable of liquid extraction and pipetting and are configured to draw samples from the first 96-well microplate and to transfer the samples to the second 96-well microplate.

3. The high-throughput screening system according to claim 1, wherein the microplate reader comprises a system integrated automatic digital microscope or microplate detector.

4. The high-throughput screening system according to claim 1, wherein the first manipulator and the second manipulator cooperate with each other to complete automatic loading, unloading and transferring of the first 96-well microplate and the second 96-well microplate.

5. The high-throughput screening system according to claim 1, wherein the first 96-well microplate library comprises a base plate with a first groove and a second groove that are configured for holding 96-well microplates; wherein the first groove and the second groove are adjacent and are configured to allow the manipulators to catch the 96-well microplates in the grooves.

6. The high-throughput screening system according to claim 1, wherein the second 96-well microplate library comprises a base plate with grooves configured for holding 96-well microplates.

7. The high-throughput screening system according to claim 1, wherein the manipulators comprise a gripper configured to hold both sides of a workpiece.

* * * * *